United States Patent
Rajagopal et al.

(10) Patent No.: US 11,355,977 B2
(45) Date of Patent: Jun. 7, 2022

(54) MULTI-DEGREE-OF-FREEDOM ELECTROMAGNETIC MACHINE WITH HALBACH ARRAY

(71) Applicant: HONEYWELL INTERNATIONAL INC., Morris Plains, NJ (US)

(72) Inventors: Subhashree Rajagopal, Bangalore (IN); Deena Dayalan Kothandaraman, Bangalore (IN); Sivanagamalleswara Bavisetti, Bangalore (IN); Govind Yadav, Bangalore (IN); Ramakrishna Rao P. V, Bangalore (IN); Harshit Agrawal, Indore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 227 days.

(21) Appl. No.: 16/712,503

(22) Filed: Dec. 12, 2019

(65) Prior Publication Data
US 2021/0184521 A1 Jun. 17, 2021

(51) Int. Cl.
*H02K 1/2746* (2022.01)
*H02K 1/18* (2006.01)
(Continued)

(52) U.S. Cl.
CPC ........... *H02K 1/2746* (2013.01); *H02K 1/185* (2013.01); *H02K 1/2786* (2013.01); *H02K 21/22* (2013.01);
(Continued)

(58) Field of Classification Search
CPC .... H02K 1/2746; H02K 1/185; H02K 1/2786; H02K 21/22; H02K 2201/18; B64C 2201/042; B64C 39/02
See application file for complete search history.

(56) References Cited

U.S. PATENT DOCUMENTS 6,858,962 B2 2/2005 Post
9,178,393 B2 11/2015 Yano
(Continued)

FOREIGN PATENT DOCUMENTS

CN 101282070 A 10/2008
CN 101908399 B 5/2012
EP 3032703 A2 6/2016

OTHER PUBLICATIONS

Xia, Changliang, et al. "3-D Magnetic Field and Torque Analysis of a Novel Halbach Array Permanent-Magnet Spherical Motor," IEEE Transactions on Magnetics, vol. 44, No. 8, Aug. 2008.
(Continued)

*Primary Examiner* — Tulsidas G Patel
*Assistant Examiner* — Riley O Stout
(74) *Attorney, Agent, or Firm* — Lorenz & Kopf, LLP

(57) ABSTRACT

A multi-degree-of-freedom electromagnetic machine includes a spherical structure, a first coil, a second coil, a non-magnetic structure, and a Halbach array. The spherical structure has a first axis of symmetry, a second axis of symmetry, and a third axis of symmetry, and the first, second, and third axes of symmetry are disposed perpendicular to each other. The first coil is wound on the spherical structure about the first axis of symmetry, and the second coil is wound on the spherical structure about the second axis of symmetry. The non-magnetic structure is spaced apart from, and at least partially surrounds, the spherical structure. The Halbach array is mounted on the non-magnetic structure and includes N-magnets, where N is a multiple of 4. The spherical structure and non-magnetic structure are mounted to allow relative rotation between the non-magnetic structure and the spherical structure.

11 Claims, 8 Drawing Sheets

(51) Int. Cl.
*H02K 1/2786* (2022.01)
*H02K 21/22* (2006.01)
*B64C 39/02* (2006.01)

(52) U.S. Cl.
CPC ...... *B64C 39/024* (2013.01); *B64C 2201/042* (2013.01); *H02K 2201/18* (2013.01)

(56) References Cited

U.S. PATENT DOCUMENTS

| | | |
|---|---|---|
| 9,509,198 B2 | 11/2016 | Jahshan |
| 9,893,574 B2 | 2/2018 | Bandera |
| 10,118,716 B2 | 11/2018 | Bandera |
| 2009/0128272 A1 | 5/2009 | Hills |
| 2017/0040861 A1* | 2/2017 | Ho .................. H02K 15/08 |
| 2018/0219452 A1 | 8/2018 | Boisclair et al. |
| 2018/0273212 A1* | 9/2018 | Zhu .................. G01C 19/24 |

OTHER PUBLICATIONS

Ibtissam, Bouloukza, "Magnetic Field Anaysis of Halbach Permanent Magnetic Synchronous Machine," International Conference on Control, Engineering & Information Technology Proceedings, Copyright IPCO-2014, ISSN 2356-5608.

Hongfeng Li and Tianmeng Li, "End-Effect Magnetic Field Analysis of the Halback Array Permanent Magnet Spherical Motor," IEEE Transactions on Magnetics, vol. 54, No. 4, Apr. 2018.

* cited by examiner

MULTI-DEGREE-OF-FREEDOM ELECTROMAGNETIC MACHINE WITH HALBACH ARRAY

TECHNICAL FIELD

The present invention generally relates to electromagnetic machines, and more particularly relates to a multi-degree-of-freedom electromagnetic machine with a Halbach array.

BACKGROUND

Recent developments in the field of UAV (Unmanned Aerial Vehicles), drones for unmanned air transport, robotics, office automation, and intelligent flexible manufacturing and assembly systems have necessitated the development of precision actuation systems with multiple degrees of freedom (DOF). Conventionally, applications that rely on multiple (DOF) motion have typically done so by using a separate motor/actuator for each axis, which results in complicated transmission systems and relatively heavy structures.

With the advent of spherical motors, there have been multiple attempts to replace the complicated multi-DOF assembly with a single spherical motor assembly. A typical spherical motor consists of a central sphere on which coils are wound, which may be orthogonally placed from each other. The sphere is surrounded by multi-pole magnets, which may be in the form of a sphere or an open cylinder.

Unfortunately, many existing spherical motors exhibit some less than optimum characteristics. For example, many existing spherical motors exhibit non-uniform torque at different positions, which can make its control relatively complicated. This is due, at least in part, to the non-sinusoidal air-gap flux. Also, the rotating part (e.g., the armature/rotor) is relatively heavy due to the magnets and the steel arrangement. Moreover, many existing spherical motors can be relatively difficult to control due to the non-linear torque profile, and do not provide the maximum intended torque at all positions, thereby limiting useful work and the average torque output.

Hence, there is a need for a multi-degree-of-freedom electromagnetic machine that exhibits more uniform torque at different positions and/or exhibits a sinusoidal air-gap flux and/or is relatively more easy to control. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree-of-freedom electromagnetic machine includes a spherical structure, a first coil, a second coil, a non-magnetic structure, and a Halbach array. The spherical structure has a first axis of symmetry, a second axis of symmetry, and a third axis of symmetry, and the first, second, and third axes of symmetry are disposed perpendicular to each other. The first coil is wound on the spherical structure about the first axis of symmetry, and the second coil is wound on the spherical structure about the second axis of symmetry. The non-magnetic structure is spaced apart from, and at least partially surrounds, the spherical structure. The Halbach array is mounted on the non-magnetic structure and includes N-magnets, where N is a multiple of 4. The spherical structure and non-magnetic structure are mounted to allow relative rotation between the non-magnetic structure and the spherical structure.

In another embodiment, a multi-degree-of-freedom electromagnetic machine includes a spherical structure, a first coil, a second coil, an aluminum structure, and a 16-magnet Halbach array. The spherical structure has a first axis of symmetry, a second axis of symmetry, and a third axis of symmetry, and the first, second, and third axes of symmetry are disposed perpendicular to each other. The first coil is wound on the spherical structure about the first axis of symmetry, and the second coil is wound on the spherical structure about the second axis of symmetry. The aluminum structure is spaced apart from, and at least partially surrounds, the spherical structure. The aluminum structure is mounted to rotate relative to the spherical structure and has an inner surface and an outer surface. The 16-magnet Halbach array is mounted on the inner surface of the aluminum structure.

In yet another embodiment, a multi-degree-of-freedom electromagnetic machine includes a spherical structure, a first coil, a second coil, a third coil, an aluminum structure, and a 16-magnet Halbach array. The spherical structure comprises a magnetically permeable material and has a first axis of symmetry, a second axis of symmetry, and a third axis of symmetry, where the first, second, and third axes of symmetry are disposed perpendicular to each other. The first coil is wound on the spherical structure about the first axis of symmetry, the second coil is wound on the spherical structure about the second axis of symmetry, and the third coil is wound on the spherical structure about the third axis of symmetry. The aluminum structure is spaced apart from, and at least partially surrounds, the spherical structure, and has an inner surface and an outer surface. The 16-magnet Halbach array is mounted on the inner surface of the aluminum structure. The spherical structure and aluminum structure are mounted to allow relative rotation between the non-magnetic structure and the spherical structure.

Furthermore, other desirable features and characteristics of the multi-degree-of-freedom electromagnetic machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
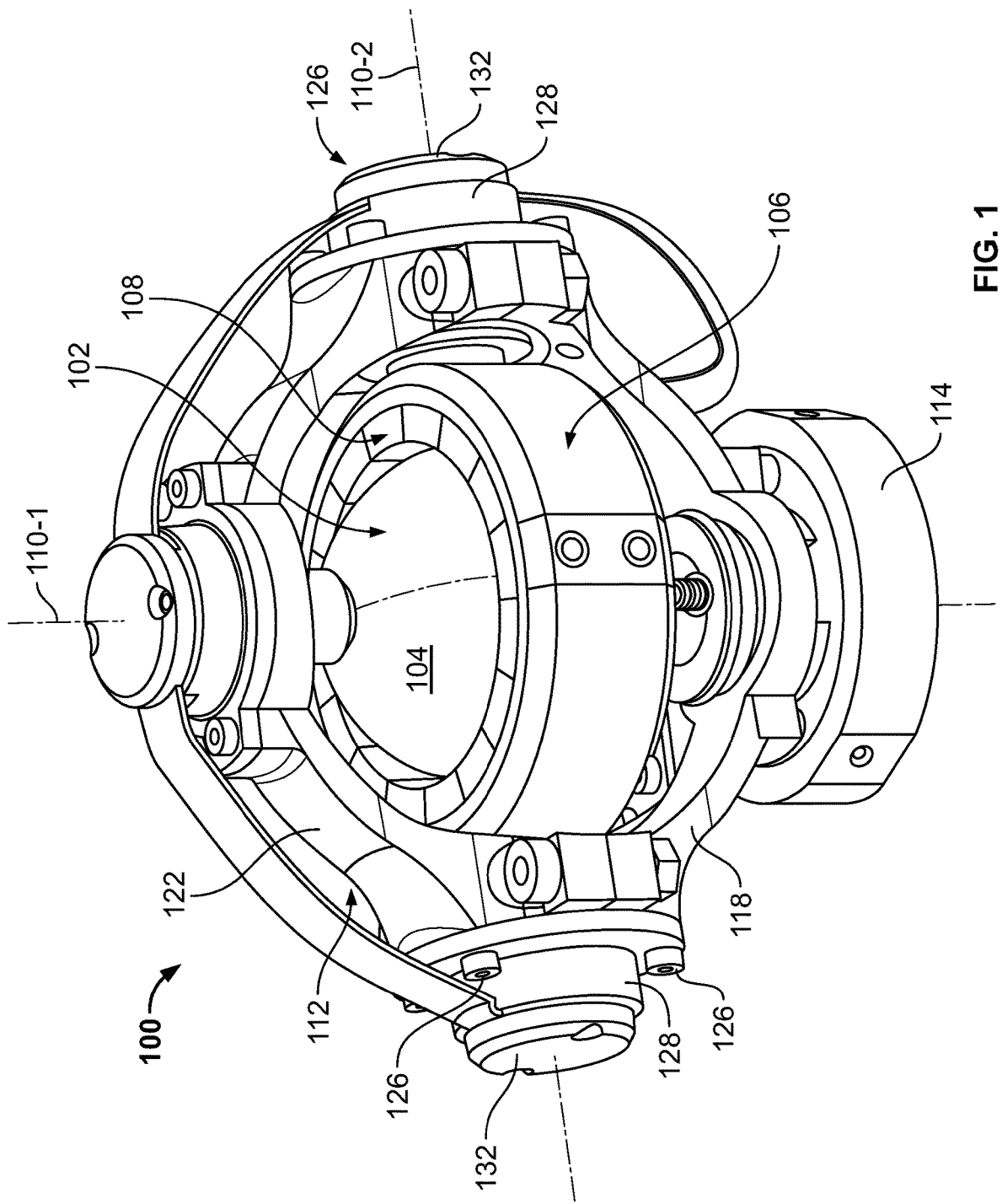
FIG. 1 is a plan view of one embodiment of a multi-degree-of-freedom electromagnetic machine.
Figure 2:
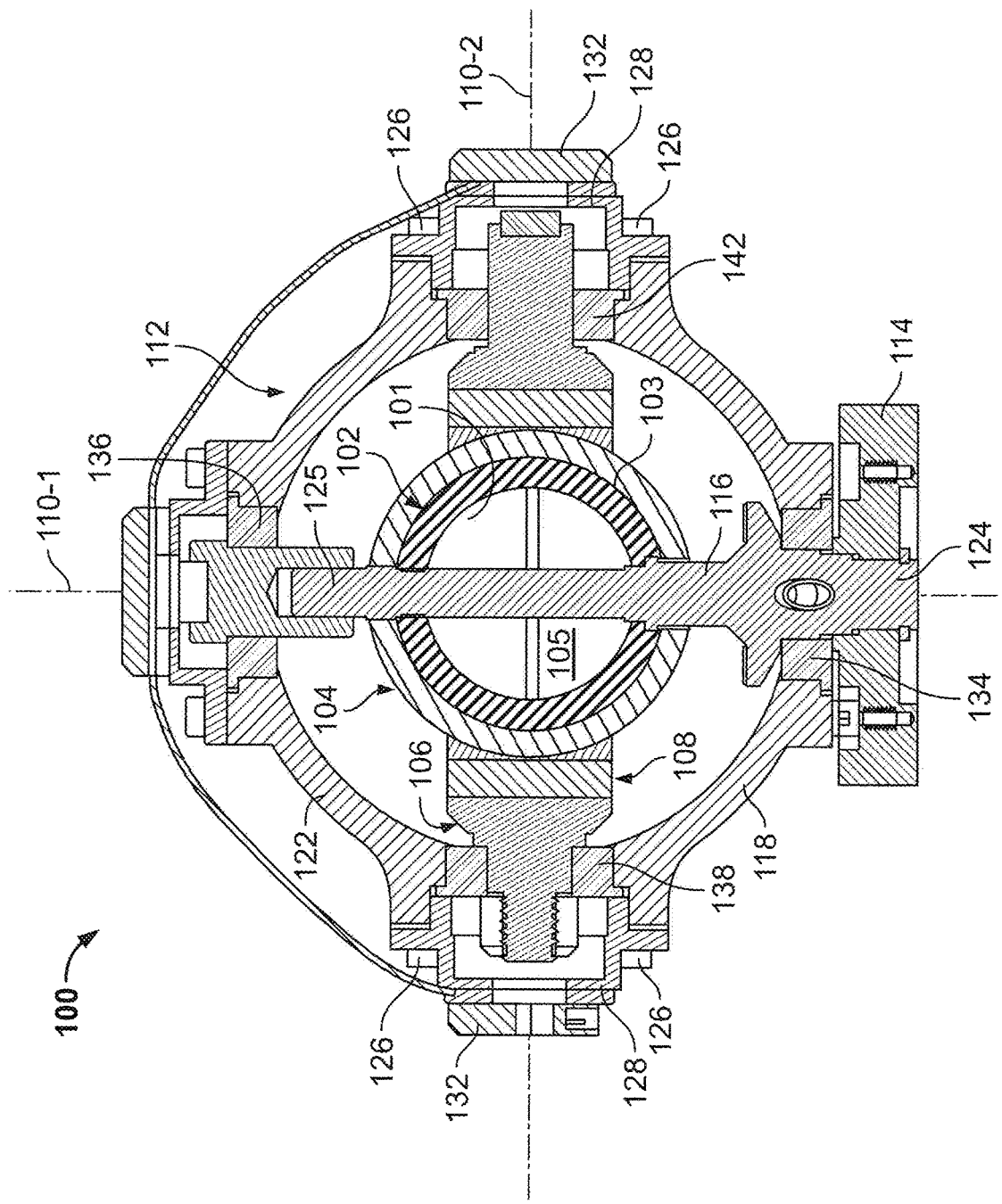
FIG. 2 is a cross section view of the multi-degree-of-freedom electromagnetic machine depicted in FIG. 1.

Referring to FIGS. 1 and 2, a plan view and cross section view, respectively, of an embodiment of a multi-degree-of-freedom electromagnetic machine 100 is depicted. The depicted electromagnetic machine 100 includes a spherical structure 102, a plurality of coils 104, a non-magnetic structure 106, and a Halbach array 108. The spherical structure 102, at least in the depicted embodiment, is hollow. That is, as depicted more clearly in FIG. 2, it includes an inner surface 101 and an outer surface 103, and the inner surface 101 defines a cavity 105. The spherical structure 102 is preferably formed of a magnetically permeable material, but it could also be formed of a non-magnetic material, if needed or desired. Although any one of numerous magnetically permeable materials could be used, some non-limiting examples include an iron steel, such as DT4, DT4A, DT4E, DT4C, Hiperco 50®, and Hiperco 50A®, or a low-carbon steel.

Figure 3:
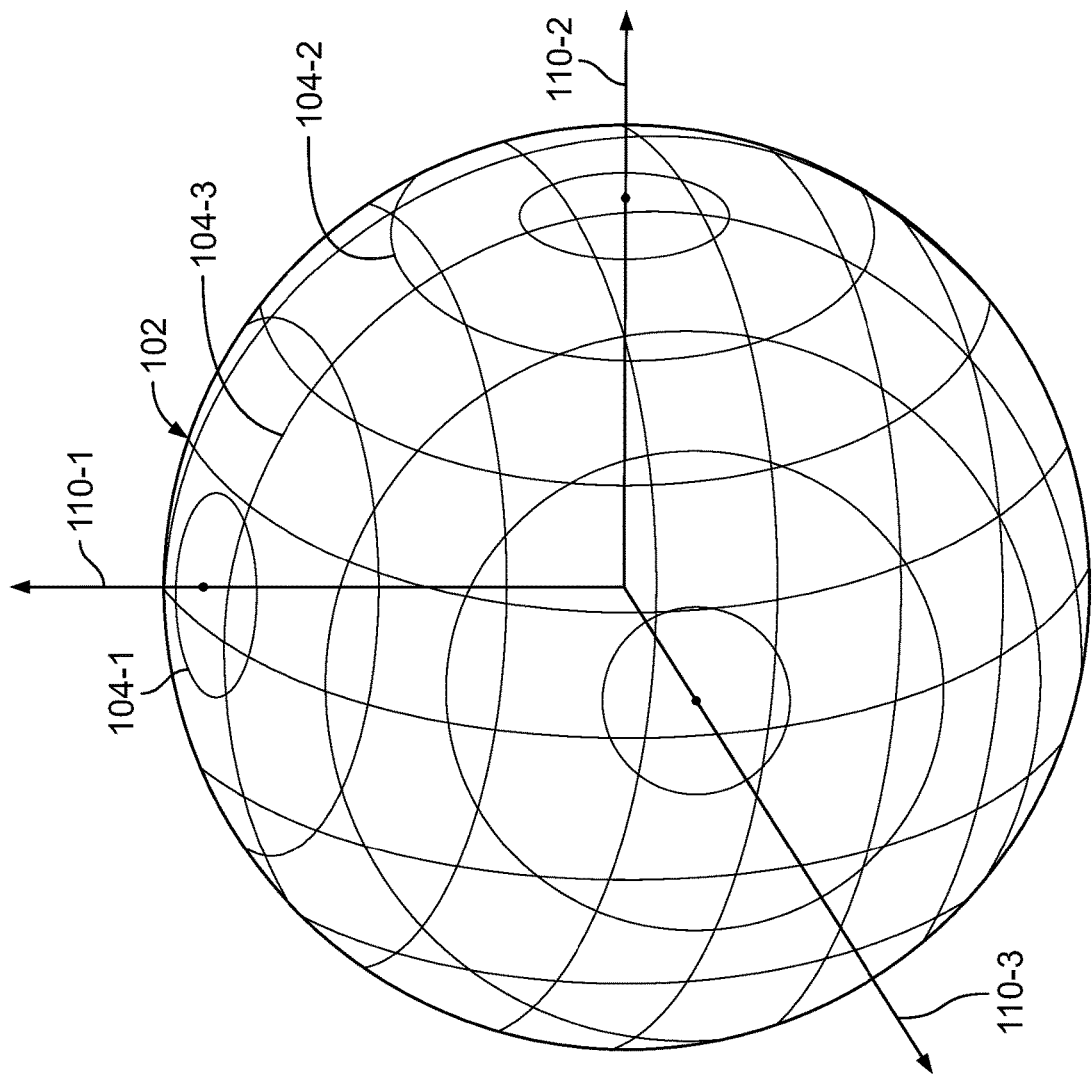
FIG. 3 is a representation of a spherical structure and stator windings that may be used to implement the multi-degree-of-freedom electromagnetic machine depicted in FIGS. 1 and 2.

No matter the specific material, and as FIG. 3 shows more clearly, the spherical structure 102 has three perpendicularly disposed axes of symmetry—a first axis of symmetry 110-1, a second axis of symmetry 110-2, and a third axis of symmetry 110-3 (depicted only in FIG. 3). The spherical structure 102 has the plurality of coils 104 wound thereon. In the depicted embodiment, these include a first coil 104-1, a second coil 104-2, and a third coil 104-3. It will be appreciated, however, that in some embodiments the electromagnetic machine 100 may be implemented with only two coils instead of three, and operate as a limited angle torque motor with two degrees-of-freedom.

As FIG. 3 further depicts, the first coil 104-1 is wound on the spherical structure 102 about the first axis of symmetry 110-1, the second coil 104-2 is wound on the spherical structure 102 about the second axis of symmetry 110-2, and the third coil 104-3, when included, is wound on the spherical structure 102 about the third axis of symmetry 110-3. It should be noted that a sphere has an infinite number of axes of symmetry. Thus, the first, second, and third axes of symmetry 110-1, 110-2, 110-3, could be any one of these axes of symmetry, so long as all three axes of symmetry are perpendicular to each other.

Returning now to FIGS. 1 and 2, it is seen that the non-magnetic structure 106 is spaced apart from, and at least partially surrounds, the spherical structure 102. The non-magnetic structure 106, as the name implies, is formed of a non-magnetic material. Although any one of numerous plastic or non-magnetic metallic materials could be used, in a particular embodiment, the non-magnetic structure 106 is formed of aluminum. As such, in some instances it may also be referred to as an aluminum rotor 106. The non-magnetic structure 106 is also mounted to rotate relative to the spherical structure 102. More specifically, it is mounted to rotate, relative to the spherical structure 102, about the first axis of symmetry 110-1 and the second axis of symmetry 110-2. One particular mounting configuration that allows these rotations will be described momentarily.

Figure 4:
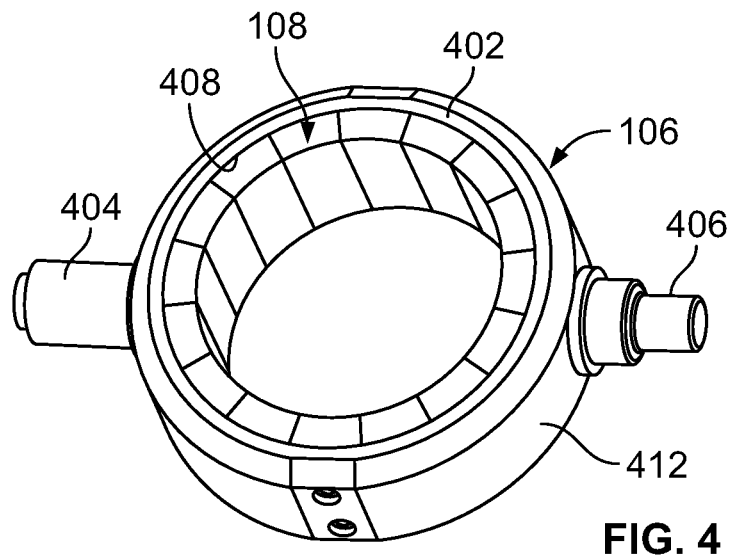
FIG. 4 is a plan view of one embodiment of a rotor and Halbach array that may be used to implement the multi-degree-of-freedom electromagnetic machine depicted in FIGS. 1 and 2.
Figure 5:
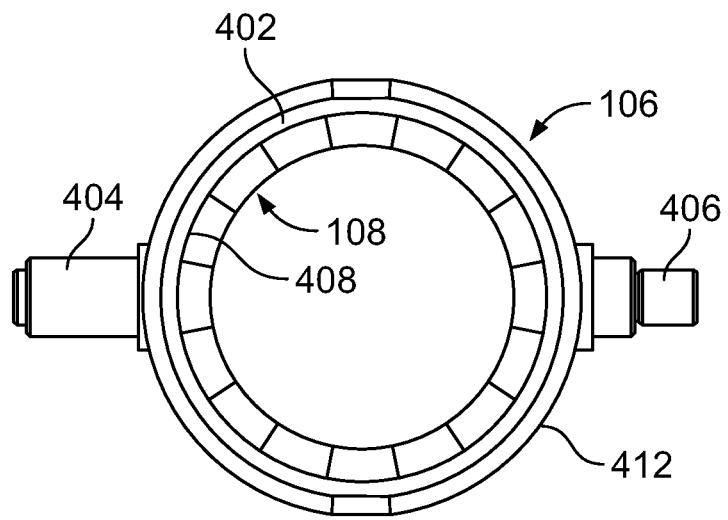
FIG. 5 is a top view of one embodiment of a rotor and Halbach array that may be used to implement the multi-degree-of-freedom electromagnetic machine depicted in FIGS. 1 and 2.

Referring now to FIGS. 4 and 5, an embodiment of the non-magnetic structure 106 separated from the electromagnetic machine 100 is depicted. As clearly illustrated therein, the non-magnetic structure 106 includes a main body 402, a first shaft portion 404, and a second shaft portion 406. The main body 402 has an inner surface 408 and an outer surface 412. The first and second shaft portions 404, 406 are diametrically opposed to each other, and each extends radially outwardly from the main body 402. As will be described in more detail momentarily, the first and second shaft portions 404, 406 are both rotationally mounted.

Figure 6:
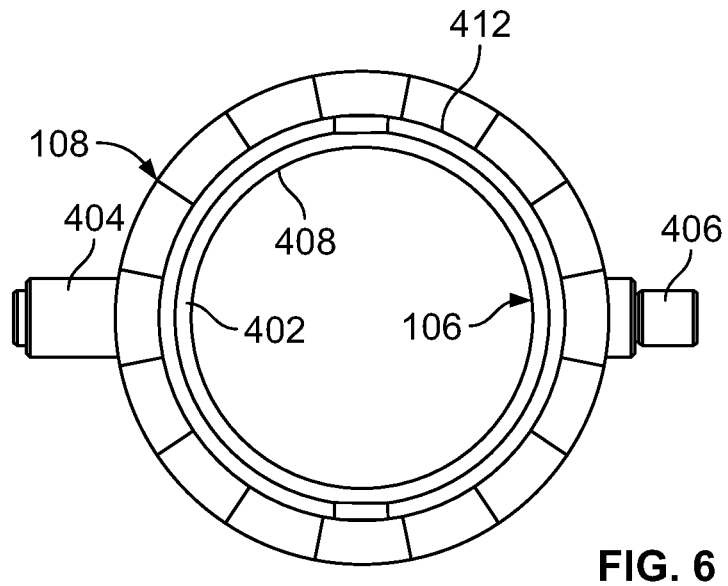
FIG. 6 is a top view of another embodiment of a rotor and Halbach array that may be used to implement the multi-degree-of-freedom electromagnetic machine depicted in FIGS. 1 and 2.

With continued reference to FIG. 4, it is seen that the Halbach array 108 is mounted on the non-magnetic structure 106. In the embodiment depicted in FIGS. 1, 2, 4, and 5, the Halbach array 108 is mounted on the inner surface 408. This, however, is merely exemplary of one embodiment. In other embodiments, as shown in FIG. 6, the Halbach array 108 may be mounted on the outer surface 412. Regardless of which surface it is mounted on, the Halbach array 108 is implemented as an N-magnet Halbach array 108, where N is a multiple of 4. In a particular preferred embodiment, the Halbach array 108 is implemented as a 16-magnet Halbach array 108 (e.g., N equals 16). As is generally known, a Halbach array is a configuration of magnets that maximizes the magnetic field on one side while minimizing it on the other. When it is configured in a ring form, as in the depicted embodiments, the magnetic field lines are focused inside the ring, toward the spherical structure 102.

Returning now to FIGS. 1 and 2, it is seen that the electromagnetic machine 100 additionally includes a frame 112, which is rotationally coupled to the spherical structure 102 and to the non-magnetic structure 106. In particular, the frame 112 is coupled to the spherical structure 102 and non-magnetic structure 104 such that the non-magnetic structure 106 and frame 112 are rotatable together, relative to the spherical structure 102, about the first axis of symmetry 110-1, and the non-magnetic structure 106 is rotatable, relative to the frame 112 and the spherical structure 102, about the second axis of symmetry 110-1. Although the frame 112 may be variously configured and implemented, in the depicted embodiment it includes a mounting flange 114, a fixed shaft 116, a lower yoke 118, and an upper yoke 122.

The mounting flange 114 is used to mount the frame 112, and thus the entire electromagnetic machine 100 to, a non-illustrated structure. Although the mounting flange 114 may be variously shaped and formed of various types of materials, in the depicted embodiment it is somewhat cylindrical in shape and is formed of aluminum.

The fixed shaft 116 includes a first end 124 and a second end 125 and extends through the spherical structure 102. The fixed shaft 116, as the name implies, is fixedly coupled to the spherical structure 102 and, at its first end 124, is also fixedly coupled to the mounting flange 114 and does not rotate. Although the fixed shaft 116 may be formed of various types of materials, in the depicted embodiment it is formed of aluminum.

The lower yoke 118 is coupled, via suitable coupling hardware, to the upper yoke 122. This coupling hardware 126 may vary, but in the depicted embodiment includes a plurality of fasteners 126, covers 128, and cover plates 132. The lower yoke 118 is also rotationally coupled to the fixed shaft 116 via a first bearing assembly 134 that is mounted on the fixed shaft 116. Thus, the lower yoke 118 is rotatable, relative to the fixed shaft 116 and the mounting flange 114, about the first axis of symmetry. The upper yoke 122 is rotationally coupled to the fixed shaft 116 via a second bearing assembly 136 that is also mounted on the fixed shaft 116. The upper yoke 122 is thus rotatable with the lower yoke 118 about the first axis of symmetry 110-1.

As FIG. 1 also depicts, a third bearing assembly 138 is mounted on the first shaft portion 404, and a fourth bearing assembly 142 is mounted on the second rotor portion 406. The third and fourth bearing assemblies 138, 142 are additionally each coupled to the lower yoke 118 and the upper yoke 122. Thus, as noted above, the non-magnetic structure 106 is rotatable, relative to the frame 112 and the spherical structure 102, about the first axis of symmetry 110-1.

With the above-described configuration, the stator windings 104 are selectively energized to generate a Lorentz force between the stator windings 104 and the 16-magnet Halbach array 108. This in turn imparts a torque to the non-magnetic structure 106 that causes it to rotate, relative to the stator 102, about one or both of the first rotational axis 110-1 and the second rotational axis 110-2.

In the embodiment described above, the non-magnetic structure 106 is mounted to rotate relative to the spherical structure 102. In another embodiment, the spherical structure 102 is mounted to rotate relative to the non-magnetic structure 106. In this embodiment, an example of which is depicted in FIGS. 7 and 8, the non-magnetic structure 106 is fixedly mounted to a frame 702, which is in turn fixedly mounted to a non-illustrated structure.

The spherical structure 102 is rotationally coupled to the frame 702 and is rotatable relative to the non-magnetic structure 106. Specifically, it is mounted to rotate, relative to the non-magnetic structure 106, at least about the first axis of symmetry 110-1 and the second axis of symmetry 110-2. In some embodiments, such as the one depicted in FIGS. 7 and 8, the spherical structure 102 may also be mounted to rotate, relative to the non-magnetic structure 106, about the third axis of symmetry 110-3. To provide this functionality, the spherical structure 102 has a ball socket 704 formed therein. The ball socket 704 receives a ball joint 706 that is formed on one end of a shaft 708. The shaft 708 is fixedly coupled, at its other end, to the frame 702 and extends radially inwardly from the frame 702.

Figure 7:
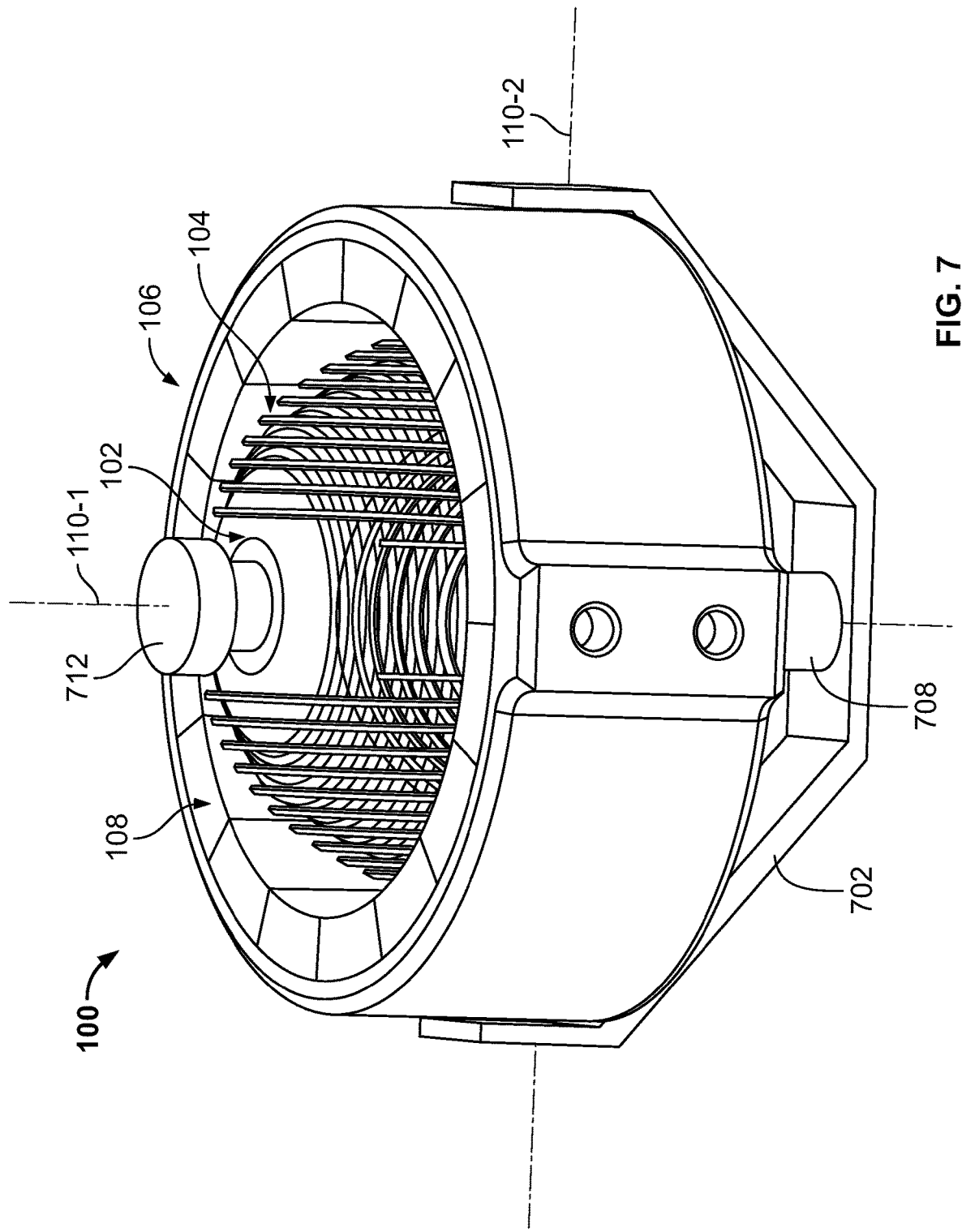
FIG. 7 is a plan view of another embodiment of a multi-degree-of-freedom electromagnetic machine.
Figure 8:
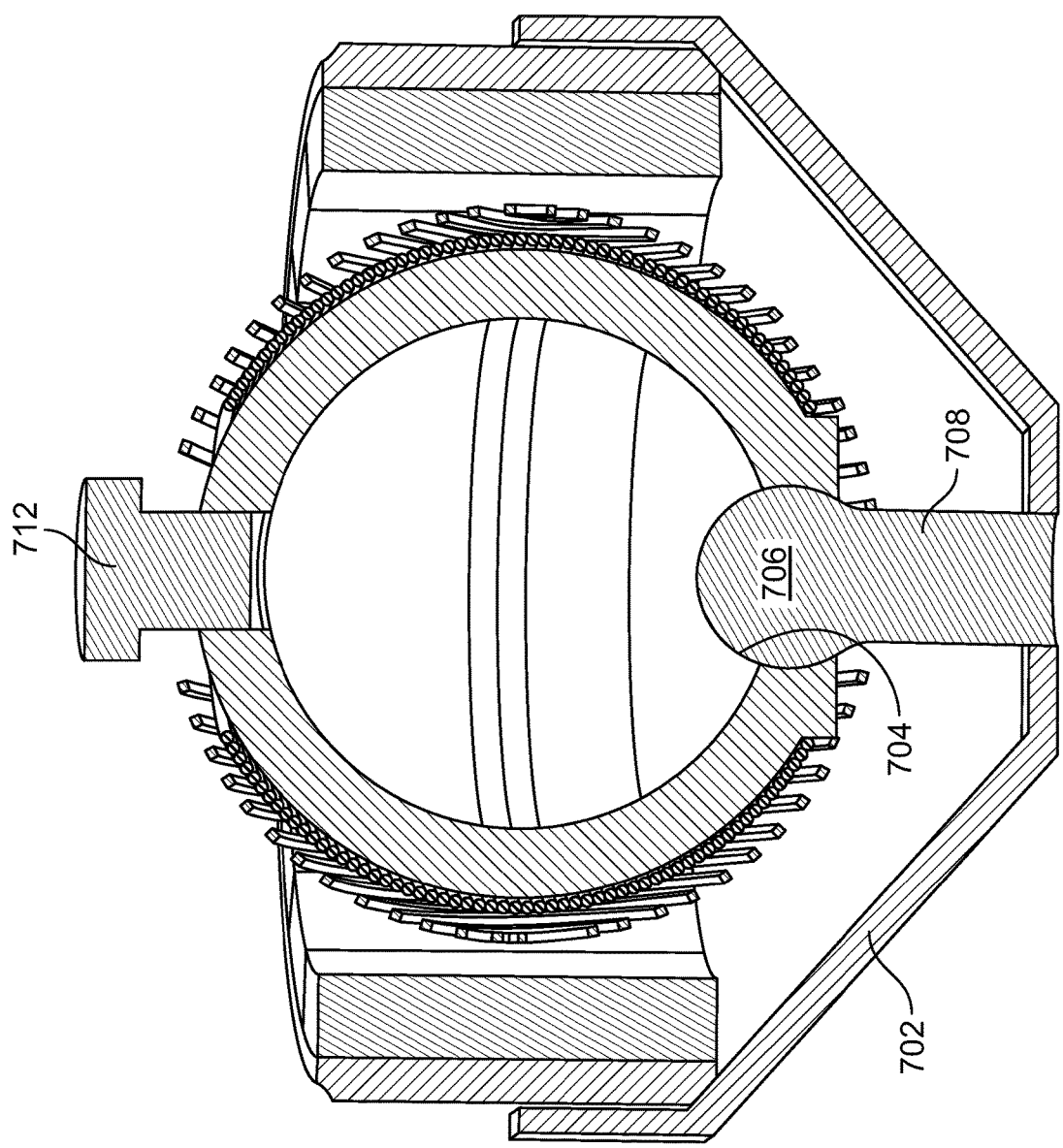
FIG. 8 is a cross section view of the multi-degree-of-freedom electromagnetic machine depicted in FIG. 7.

The embodiment depicted in FIGS. 7 and 8 may also include a device mounting shaft 712. The device mounting shaft 712, when included, is fixedly coupled to the spherical structure 102, and is thus rotatable therewith. The device mounting shaft 712 may be coupled to the spherical structure 102 via threads, a press fit, or an adhesive, just to name a few techniques. Various devices including, but not limited to, one or more cameras, one or more sensors, or a propeller, may be coupled to, and rotatable with, the device mounting shaft 712.

Figure 9:
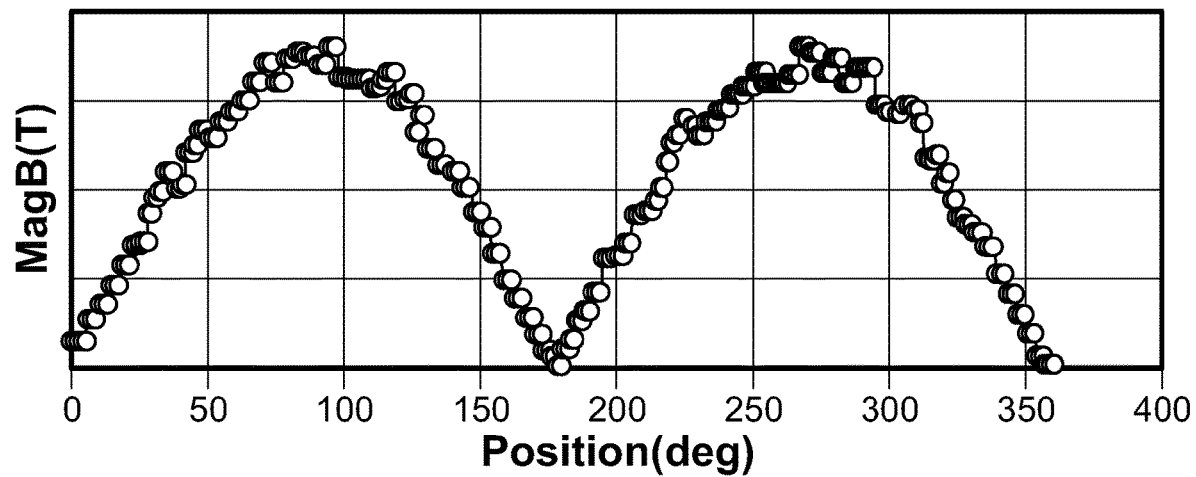
FIG. 9 depicts a graph of air-gap flux versus position for the multi-degree-of-freedom electromagnetic machine depicted in FIGS. 1 and 2.
Figure 10:
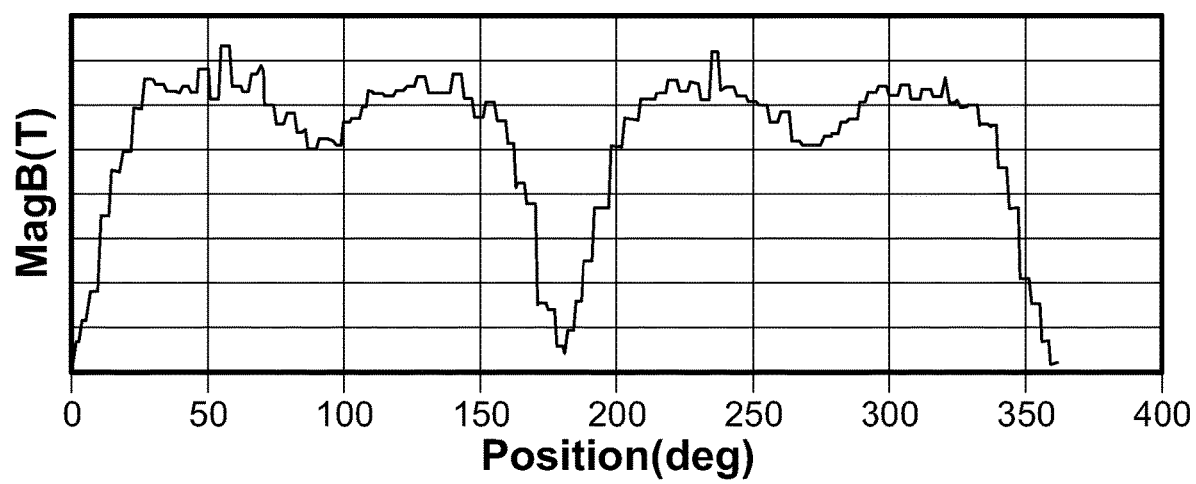
FIG. 10 depicts a graph of air-gap flux versus position for a currently known multi-degree-of-freedom electromagnetic machine.
Figure 11:
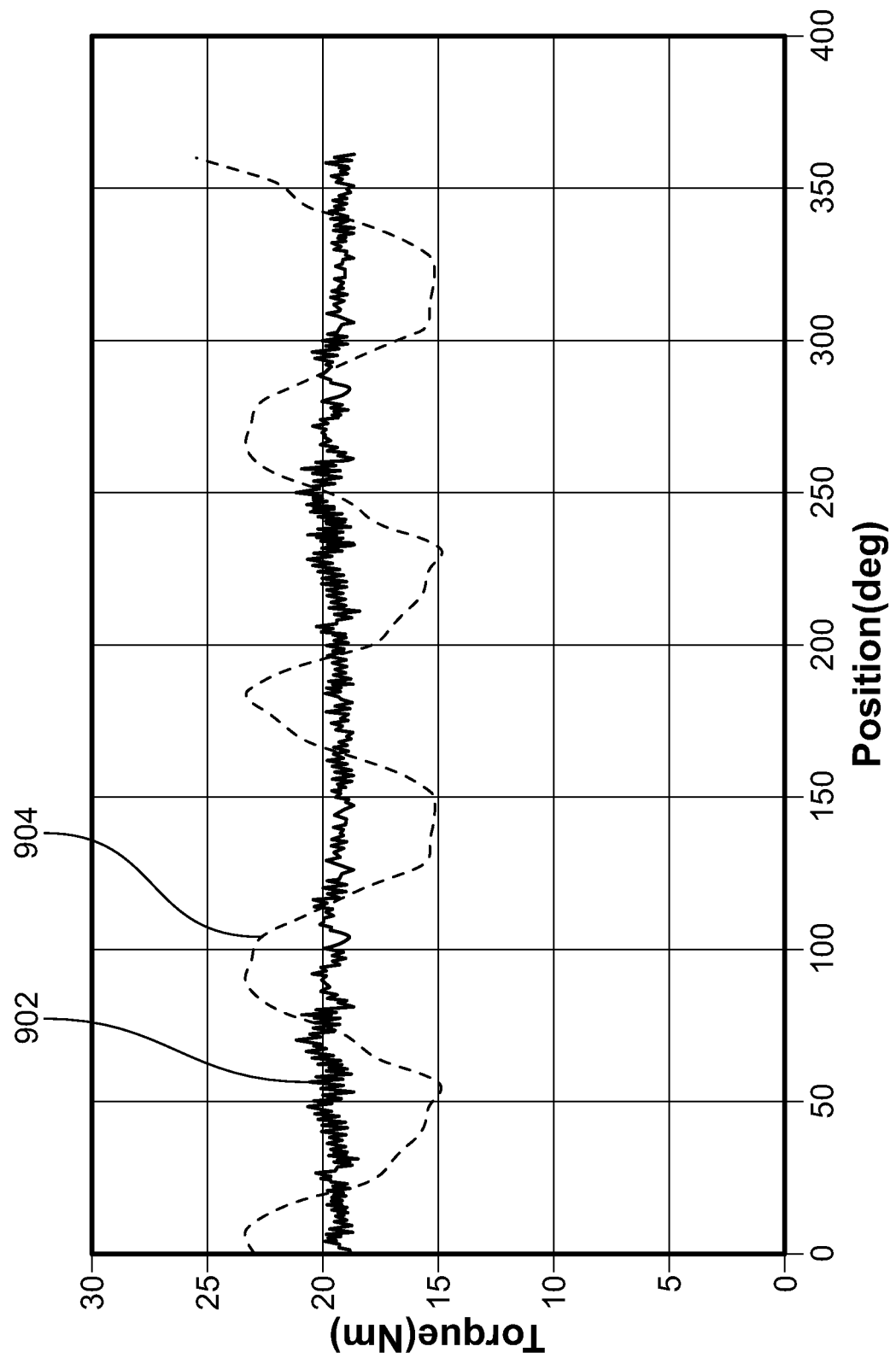
FIG. 11 depicts a graph of torque versus position for both the multi-degree-of-freedom electromagnetic machine depicted in FIGS. 1 and 2 and for a currently known multi-degree-of-freedom electromagnetic machine.

The electromagnetic machine 100 disclosed herein provides unexpectedly improved results over presently known multi-degree-of-freedom electromagnetic machines. For example, presently known multi-degree-of-freedom electromagnetic machines exhibit a holding torque of around 0.019 N-m, whereas the electromagnetic machine 100 disclosed herein unexpectedly provides a holding torque of 0.024 N-m. In addition, presently known multi-degree-of-freedom electromagnetic machines exhibit minimum positional errors of approximately 1.5-degrees. However, the electromagnetic machine unexpectedly exhibits a positional error of only 0.15-degrees. The electromagnetic machine 100 disclosed herein exhibits a nearly sinusoidal air-gap flux density, as illustrated in FIG. 7. Conversely, as FIG. 8 depicts, the air-gap flux density exhibited in presently known multi-degree-of-freedom electromagnetic machines is highly non-sinusoidal. Furthermore, as FIG. 9 depicts, the torque versus position 902 that the electromagnetic machine 100 disclosed herein exhibits is significantly and unexpectedly smoother that that of presently known multi-degree-of-freedom electromagnetic machines 904.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine, comprising:
 a spherical structure having a first axis of symmetry, a second axis of symmetry, and a third axis of symmetry, the first, second, and third axes of symmetry disposed perpendicular to each other;

a first coil wound on the spherical structure about the first axis of symmetry;

a second coil wound on the spherical structure about the second axis of symmetry;

a non-magnetic structure spaced apart from, and at least partially surrounding, the spherical structure;

a frame rotationally coupled to the spherical structure and to the non-magnetic structure, such that (i) the non-magnetic structure and frame are rotatable together, relative to the spherical structure, about the first axis of symmetry, and (ii) the non-magnetic structure is rotatable, relative to the frame and the spherical structure, about the second axis of symmetry; and a Halbach array mounted on the non-magnetic structure, the Halbach array comprising N-magnets, where N is a multiple of 4, wherein the spherical structure and non-magnetic structure are mounted to allow relative rotation between the non-magnetic structure and the spherical structure, wherein the frame comprises:
a mounting flange;
a fixed shaft extending through the spherical structure, the fixed shaft fixedly coupled to both the mounting flange and the spherical structure;
a lower yoke rotationally coupled to the shaft and rotatable, relative to the shaft and the mounting flange, about the first axis of symmetry; and
an upper yoke rotationally coupled to the shaft, the upper yoke coupled to, and rotatable with, the lower yoke, and wherein the non-magnetic structure comprises:
a main body;
a first shaft portion extending radially outwardly from the main body and rotationally mounted between the lower yoke and the upper yoke; and
a second shaft portion extending radially outwardly from the main body and diametrically opposed to the first shaft portion, the second shaft portion rotationally mounted between the lower yoke and the upper yoke.

2. The electromagnetic machine of claim 1, wherein:
the non-magnetic structure comprises one of aluminum and plastic; and
N equals 16.

3. The electromagnetic machine of claim 1, wherein the non-magnetic structure is mounted to rotate, relative to the spherical structure, about the first axis of symmetry and the second axis of symmetry.

4. The electromagnetic machine of claim 1, further comprising:
a first bearing assembly mounted on the fixed shaft and coupled to the lower yoke; and
a second bearing assembly mounted on the fixed shaft and coupled to the upper yoke.

5. The electromagnetic machine of claim 4, further comprising:
a third bearing assembly mounted on the first shaft portion and coupled to the lower yoke and the upper yoke; and
a fourth bearing assembly mounted on the second shaft portion and coupled to the lower yoke and the upper yoke.

6. The electromagnetic machine of claim 1, wherein:
non-magnetic structure has an inner surface and an outer surface; and the 16-magnet Halbach array is mounted on one of the inner surface or the outer surface of the non-magnetic structure.

7. The electromagnetic machine of claim 1, further comprising:
a third coil wound on the spherical structure about the third axis of symmetry.

8. A multi-degree-of-freedom electromagnetic machine, comprising:
a spherical structure comprising a magnetically permeable material and having a first axis of symmetry, a second axis of symmetry, and a third axis of symmetry, the first, second, and third axes of symmetry disposed perpendicular to each other;

a first coil wound on the spherical structure about the first axis of symmetry;

a second coil wound on the spherical structure about the second axis of symmetry;

an aluminum structure spaced apart from, and at least partially surrounding, the spherical structure, the aluminum structure mounted to rotate relative to the spherical structure and having an inner surface and an outer surface;

a frame rotationally coupled to the spherical structure and to the aluminum structure, such that (i) the aluminum structure and frame are rotatable together, relative to the spherical structure, about the first axis of symmetry, and (ii) the aluminum structure is rotatable, relative to the frame and the spherical structure, about the second axis of symmetry; and a 16-magnet Halbach array mounted on the inner surface of the aluminum structure, wherein the frame comprises:
a mounting flange;
a fixed shaft extending through the spherical structure, the fixed shaft fixedly coupled to both the mounting flange and the spherical structure;
a lower yoke rotationally coupled to the shaft and rotatable, relative to the shaft and the mounting flange, about the first axis of symmetry; and
an upper yoke rotationally coupled to the shaft, the upper yoke coupled to, and rotatable with, the lower yoke, and wherein the aluminum structure comprises:
a main body;
a first shaft portion extending radially outwardly from the main body and rotationally mounted between the lower yoke and the upper yoke; and
a second shaft portion extending radially outwardly from the main body and diametrically opposed to the first shaft portion, the second shaft portion rotationally mounted between the lower yoke and the upper yoke.

9. The electromagnetic machine of claim 8, further comprising:
a first bearing assembly mounted on the fixed shaft and coupled to the lower yoke;
a second bearing assembly mounted on the fixed shaft and coupled to the upper yoke;
a third bearing assembly mounted on the first shaft portion and coupled to the lower yoke and the upper yoke; and
a fourth bearing assembly mounted on the second shaft portion and coupled to the lower yoke and the upper yoke.

10. The electromagnetic machine of claim 8, further comprising:

a third coil wound on the spherical structure about the third axis of symmetry.

11. A multi-degree-of-freedom electromagnetic machine, comprising:
- a spherical structure having a first axis of symmetry, a second axis of symmetry, and a third axis of symmetry, the first, second, and third axes of symmetry disposed perpendicular to each other;
- a first coil wound on the spherical structure about the first axis of symmetry;
- a second coil wound on the spherical structure about the second axis of symmetry;
- a non-magnetic structure spaced apart from, and at least partially surrounding, the spherical structure;
- a frame rotationally coupled to the spherical structure and fixedly coupled to the non-magnetic structure, such that the spherical structure is rotatable, relative to the frame and the non-magnetic structure, at least about the first axis of symmetry and the second axis of symmetry;
- a ball socket formed in the spherical structure;
- a shaft having a first end and a second end and extending radially inwardly from the frame, the first end coupled to the frame, the second end having a ball joint formed thereon, the ball joint disposed within the ball socket; and
- a Halbach array mounted on the non-magnetic structure, the Halbach array comprising N-magnets, where N is a multiple of 4.

* * * * *